(12) United States Patent
Mohanty et al.

(10) Patent No.: US 8,465,842 B2
(45) Date of Patent: Jun. 18, 2013

(54) BIAXIAL ORIENTED POLYESTER FILM AND A PROCESS FOR PREPARING THE SAME

(75) Inventors: Bidhan Krushna Mohanty, Uttar Pradesh (IN); Krishna Reddy, Uttar Pradesh (IN)

(73) Assignee: Polyplex Corporation Limited, Uttar Pradesh (IN)

( * ) Notice: Subject to any disclaimer, the term of this patent is extended or adjusted under 35 U.S.C. 154(b) by 359 days.

(21) Appl. No.: 12/735,266

(22) PCT Filed: Dec. 17, 2008

(86) PCT No.: PCT/IB2008/003511
§ 371 (c)(1),
(2), (4) Date: Sep. 28, 2010

(87) PCT Pub. No.: WO2009/083771
PCT Pub. Date: Jul. 9, 2009

(65) Prior Publication Data
US 2011/0028677 A1  Feb. 3, 2011

(30) Foreign Application Priority Data

Dec. 27, 2007 (IN) .......................... 2740/DEL/2007

(51) Int. Cl.
| | | |
|---|---|---|
| *B32B 27/36* | (2006.01) | |
| *B29C 55/10* | (2006.01) | |
| *B29C 55/12* | (2006.01) | |
| *C08G 63/16* | (2006.01) | |
| *C08G 63/18* | (2006.01) | |
| *C08G 63/181* | (2006.01) | |
| *C08G 63/183* | (2006.01) | |
| *C08G 63/189* | (2006.01) | |
| *C08G 63/199* | (2006.01) | |

(52) U.S. Cl.
USPC ..... 428/480; 428/910; 264/288.4; 264/289.6; 264/290.2; 528/302; 528/307; 528/308; 528/308.1; 528/308.6; 528/308.7; 528/308.8

(58) Field of Classification Search
None
See application file for complete search history.

(56) References Cited

U.S. PATENT DOCUMENTS

| | | | | | |
|---|---|---|---|---|---|
| 4,241,170 | A | * | 12/1980 | Bayless | 430/533 |
| 4,477,506 | A | * | 10/1984 | Wang | 428/172 |
| 5,804,265 | A | * | 9/1998 | Saad et al. | 428/35.2 |
| 7,534,487 | B2 | * | 5/2009 | Klein et al. | 428/328 |

FOREIGN PATENT DOCUMENTS

| | | |
|---|---|---|
| EP | 0 483 757 B1 | 6/1995 |
| EP | 0 574 232 B1 | 10/1997 |
| EP | 0 543 308 B1 | 1/1998 |
| EP | 0 787 760 B1 | 7/2002 |

(Continued)

OTHER PUBLICATIONS

International Search Report for International Patent Application No. PCT/IB2008/003511, completed Mar. 12, 2009.

(Continued)

*Primary Examiner* — Vivian Chen
(74) *Attorney, Agent, or Firm* — Foley & Lardner LLP (57) ABSTRACT

The present invention relates to a biaxial oriented polyester film and process for preparing the same, the said film is having an average ellipticity of not more than 0.6, Poisson ratio of not more than 0.7 (at elongation greater than 25%) all along the width of web and residual enthalpy in the range of 12% to 20%, a continuous reduction in residual film area up to an elongation of 100%.

17 Claims, 3 Drawing Sheets

FOREIGN PATENT DOCUMENTS

| | | |
|---|---|---|
| EP | 1 582 967 A1 | 10/2005 |
| EP | 1 602 683 A1 | 12/2005 |
| WO | WO 01/10928 A1 | 2/2001 |
| WO | WO 2004/003055 A1 | 1/2004 |
| WO | WO 2006/001659 A1 | 1/2006 |

OTHER PUBLICATIONS

International Preliminary Report on Patentability for International Patent Application No. PCT/IB2008/003511, completed Mar. 12, 2009.

* cited by examiner

Fig.1 (a):

Ten samples of 250 mm square were cut across the web (along TD) so as to cover the entire web symmetrically as shown below.

Fig. 1(b) :Diagram for drawing samples of eight nos. of 25mm wide strips along 0°, 45°, 90°, 135°, 180°, 225°, 270° and 315° with respect to machine direction(MD) from 250 mm square sample taken for analysis

BIAXIAL ORIENTED POLYESTER FILM AND A PROCESS FOR PREPARING THE SAME

FIELD OF THE INVENTION

The present invention relates to a biaxial oriented polyester film and the process for preparing the same. More particularly, it relates a biaxial oriented polyester film having easy and uniform deformation property, average ellipticity not more than 0.6, Poisson ratio not less than 0.7 (at elongation greater than 25%) and residual enthalpy in the range of 12 to 20%, a continuous reduction in residual film area up to an elongation of 100% and the process for preparing the same. The said biaxial oriented polyester film has easy and uniform deformation characteristics on application of mechanical and/or thermal stress and useful in high end packaging and wrapping applications.

BACKGROUND AND PRIOR ART OF THE INVENTION

In packaging application of polymeric films, excellent uniform film deformation is required in all directions in order to wrap the products closely while displaying the products without any distortion. The packaging include wrapping, of materials like perfume flasks, wine flagons, pot-pourris, liquer chocolate, exotic candles, Easter eggs, breads, candies, chocolates, lollypops, pastries and any other material requiring tight wrapping.

At present the manufacturers of such polymeric films for the afore-said applications require that wrapping materials should have high yield, preserve the product's flavor, taste and shape, excellent visual appearance and same time is environmental friendly. The challenge lies in finding a suitable wrap that has the right properties including excellent and easily achievable uniform residual deformation, tearing resistance, flexible and is aesthetically pleasing.

Commonly used films for the said applications are cellophane, poly vinyl chloride (PVC), high density polyethylene (HDPE) and cast polypropylene etc. However, the demerits associated with cellophane film are that these require additional moisture barrier coatings and PVC films have environmental issues. Polyolefin films are unable to achieve desired mechanical properties which are required for wrapping applications. Also, cellophane films are not preferred because the cost of production is high due to the necessity of treating toxic pollutants emitted during the manufacture thereof. Uni-axial oriented polyethylene or polyvinyl chloride films, on the other hand, have the problem of insufficient deformation property required for cling, stable wrapping including twist wrapping.

Therefore, there is a necessity for producing such a film and there has been attempt to prepare polymeric films having good packaging property along with mechanical & chemical properties, without any environmental or food hygienic problems.

Therefore, in order to overcome the afore-said drawbacks of the polymeric films, the inventors have come out with a biaxial oriented polyester film, which has multiple advantages with respect of the commercially available films of Cellophane, PVC, poly olefins etc. In view of the present growing and anticipated demand for higher end packaging areas, there is requirement of uniform and easily deformable films for convenient and easy wrapping. The film of the present invention has excellent deformation property, stiffness, puncture resistance, perfect optical properties and ease of processing. It has more area per unit mass, so is less expensive than most other films. The inventors of the present invention have made effort to produce films having stability, good quality, good efficiency without productivity losses, and which are suitable for running on high speed machines.

OBJECTIVES OF THE INVENTION

The primary objective of the present invention is to provide a biaxial polyester film having average ellipticity up to 0.6, poisson ratio of not less than 0.7 (at elongation greater than 25%) all along the width of web and residual enthalpy in the range of 12% to 20% and a continuous reduction in residual film area up to an elongation of 100%

Yet another objective of the present invention is to provide a process for preparing the biaxial oriented polyester film, which has an easy and uniform deformation characteristics on application of mechanical and/or thermal stress and useful in high end packaging applications.

SUMMARY OF THE INVENTION

The present invention relates to a single or multilayer, biaxial oriented easily deformable polyester film having specified average ellipticity, Poisson's ratio and residual enthalpy used for wrapping applications. The inventive deformable film exhibits a change in its dimension under mechanical stress and retains the deformation because its elastic properties are totally different from those of a normal film. The polyester film of the present invention shows much lower strain recovery and on elongation exhibits a markedly lower elasticity as is evident from its load elongation curve.

The properties of the polyester film in present invention are entirely different from metallizable, transparent polyester films, which are unsuitable for use of a film in twist wrapping, stretched wrapping, gift wrapping and many other similar applications.

BRIEF DESCRIPTION OF FIGURES

FIG. 2 shows a comparison of ellipticity (e) for the inventive film and a normal BOPET film (not suitable for deformable application). The average values of 'e' are 0.44 and 0.77 respectively for the inventive film and the normal film. The averages have been taken over the entire TD width of the film FIG. 3 shows a comparison of Poisson's ratio (p) for the inventive film and a normal BOPET film (not suitable for deformable application). The figure shows a marked difference in the values of the films.

DETAIL DESCRIPTION OF THE INVENTION

Accordingly, the present invention relates to a biaxial oriented polyester film characterized by an average ellipticity not more than 0.6, poisson ratio not less than 0.7 (at elongation greater than 25%) all along the width of web and residual enthalpy in the range of 12% to 20% and a continuous reduction in residual film area up to an elongation of 100%. The biaxial oriented polyester film is having glass transition temperature in the range of 55° C. to 80° C.

Further, the biaxial oriented polyester film average ellipticity 0.1 to 0.5, more preferably 0.2 to 0.5, 0.3 to 0.5, most preferably 0.2 to 0.4, 0.2 to 0.3 poisson ratio in the range of 0.6 to 1.0 all along the width of web and residual enthalpy in the range of 12% to 20% and residual film area in the range of 50 to 60% at 75% elongation. The said polyester film is having easy and uniform deformation property.

One another aspect of the present invention relates to a process for preparing the biaxial polyester film, said process comprising the steps of:
a) allowing dicarboxylic acid and alkylene glycol to react along with additives to obtain molten polyester,
b) extruding the said molten polyester through a die and quenching the same on chilled rollers in order to obtain transparent polyester film,
c) heating the polyester film obtained in step (b) and orienting the said film in biaxial directions, wherein the difference between $\Delta TMC$ (the difference in melting temperature and crystallization temperature of the said film) and TSMD (stretching temperature in machine direction) is in the range of 45° C. to 110° C., and difference between $\Delta TMC$ (the difference in melting temperature and crystallization temperature of the said film) and TSTD (stretching temperature in transverse direction) is in the range of 35° C. to 105° C. in order to obtain easily deformable film,
d) heat setting the deformable film of step (c) by maintaining temperature such as difference between heat set temperature (TP) and the difference in crystallization temperature and glass transition temperature of the said film ($\Delta TCG$) is in the range of 30° C. to 120° C., and difference between $\Delta TMC$ (difference in melting temperature and crystallization temperature of the said film) and TP (heat set temperature) is in the range of 25° C. to 110° C., for a time period in the range of 1.0 to 20 second with relaxation not more than 8% in order to obtain desired polyester film.

While carrying out the process in step (c), the difference between $\Delta TMC$ (the difference in melting temperature and crystallization temperature of the said film) and TSMD (stretching temperature in machine direction) is preferred in the range of 45° C. to 100° C., 45 to 90° C., 45 to 85° C., more preferably 45 to 80° C., 45 to 70° C., most preferably 45 to 60° C. and 45 to 55° C. and difference between $\Delta TMC$ (the difference in melting temperature and crystallization temperature of the said film) and TSTD (stretching temperature in transverse direction) is in the preferred in the range of 35° C. to 105° C., 35 to 90° C., 35 to 85° C., 35 to 75° C., 35 to 65° C. and 40 to 85° C., 40 to 65° C., 45 to 60° C. in order to obtain easily deformable film.

The dicarboxylic acid for carrying out the process is selected from the group comprising 2,6-naphthalene dicarboxylic acid, isophthalic acid, and phthalic acid, aliphatic dicarboxylic acids like adipic acid and or esters of same along with dimethyl terephthalate or terephthalic acid when used as group of dicarboxylic acids and mixture thereof.

The alkylene glycol for carrying out the process are selected from the group comprising diethylene glycol, propylene glycol, butanediol, hexandiol, neopentyl glycol, trans-1,4-cyclohexanediol and cis-1,4-cyclohexanediol along with ethylene glycol when used as group of alkylene glycols and mixture thereof.

In the present process in step (a) the dicarboxylic acid and alkylene glycol are mixed in the ratio of 1:0.3 to 1:0.5 and the additives are antiblocking agents, antioxidants and stabilizers.

Yet another aspect of the present invention, wherein in step (b) the extrusion of molten polyester is carried out at a temperature in the range of 250° C. to 300° C. Further, in step (b) the quenching is carried out at a temperature in the range of 30° C. to 50° C.

In the present process in step (c), the temperature difference $\Delta TMC$ of the said film with stretching temperature in machine direction (TSMD) is preferred in the range of 55° C. to 95° C., 55 to 85° C., 55 to 80° C. and 55 to 65° C.

Further in the present process in step (c), the temperature difference $\Delta TMC$ of the said film with stretching temperature in transverse direction (TSTD) is preferred in the range of 45° C. to 90° C., 45 to 80° C., more preferably 45 to 70° C., 45 to 65° C. and 55 to 65° C.

In the present process in step (d) the heat set temperature (TP) is selected from the condition below:
TP max−$\Delta TCG$ (difference in crystallization temperature and glass transition temperature of polyester film) is in the range of 30 to 120° C. more preferably 40 to 110° C., most preferably 45-105° C. and $\Delta TMC$-TP max is in the range of 15 to 100° C., more preferably 25 to 90° C., most preferably 30 to 85° C., and
TP min−$\Delta TCG$ is in the range of 20 to 70° C., more preferably 30 to 80° C., most preferably 40 to 90° C. and $\Delta TMC$-TP min is in the range of 65 to 110° C., more preferably 55 to 100° C. and most preferably 50 to 95° C.

Yet another aspect of the present invention, wherein in step (d), the heat set temperature (TP) is selected such as herein described:

The film produced by the above-said process is optionally provided with antistatic coatings having surface resistivity of less than $10^{14}$ ohm cm.

Further, the said film is suitable for coatings of SiOx and AlOx and is optionally vacuum metallized.

The said film is having thickness in the range of 1 to 100 micron.

The present invention relates to a single or multilayer, biaxial oriented easily deformable polyester film having specified average ellipticity, Poisson's ratio and residual enthalpy used for wrapping applications.

Polyesters films suitable for this purpose are those prepared from ethylene glycol and terephthalic acid (or dimethyl terephthalate). Besides the above, where appropriate, it may contain units of aromatic dicarboxylic acids like 2,6-naphthalene dicarboxylic acid, isophthalic acid, phthalic acid, aliphatic dicarboxylic acids like adipic acid, sabacic acid and among cycloaliphatic dicarboxylic acids cyclohexane dicarboxylic acids (in particular cycloheaxane 1,4-dicarboxylic acid) and also other alkylene glycols like diethylene glycol, propylene glycol, butanediol, hexandiol, and neopentyl glycol, and among alicyclic diols such as trans-1,4-cyclohexanediol and cis-1,4-cyclohexanediol, aromatic diols such as hydroquinone, resorcinol, 4,4'-dioxydiphenol, 2,6-naphthalenediol.

The polyester film of the present invention contains suitable additives such as antiblocking agents, antioxidants, and stabilizers; they may be contained individually or combined.

In the extrusion process for producing of this film, molten polymer is extruded through a die and quenched on chilled roll as a normal transparent polyester film in the form of substantially amorphous prefilm; this film is then reheated and oriented in sequential biaxial orientation or a simultaneous biaxial orientation.

The following processing conditions are required in order to achieve the desired biaxial oriented polyester film:

With respect to stretching in a longitudinal direction, stretching conditions require 70° C. to 110° C. of surface temperature of the heat roll. This temperature hence forth is called TSMD.

The preferred value of TSMD should be in between TSMD max and TSMD min.

Where TSMD max=Maximum allowable Stretch temperature in MD

TSMD min.=Minimum allowable stretch temperature in MD

And TSMD max. and TSMD min. must satisfy the following conditions $\Delta$TMC–TSMD max=45° C.-90° C., more preferably $\Delta$TMC–TSMD max.=50° C.-95° C. and most preferably $\Delta$TMC–TSMD max.=55° C.-95° C.

$\Delta$TMC–TSMD min=65-110 more preferably $\Delta$TMC–TSMD min.=60-105 and most preferably $\Delta$TMC–TSMD min=55-100

Where $\Delta$TMC=TM–TC and TM=Melting temperature in degree C. and TC=Crystallization temperature degree C.

Stretch ratio in the range of 1.5 to 3.5, determined by a rotation speed ratio of a heated slow-driving roll (upstream) and heated quick-driving roll (downstream).

With respect to stretching in a transverse direction (TD), stretching conditions require about 90° C.-120° C. in a tenter and a stretch ratio of about 3.0-5.0 using a tenter wherein both ends of film are fixed with clips. This temperature is hence forth called TSTD The preferred value of TSTD should be in between TSTD max and TSTD min Where TSTD max=Maximum allowable Stretch temperature in TD TSTD min.=Minimum allowable stretch temperature in TD And TSTD max and TSTD min having following conditions:

$\Delta$TMC–TSTD max=35-85 deg. C. more preferably $\Delta$TMC–TSTD max.=40-90 deg C. and most preferably $\Delta$TMC–TSTD max.=45-90 deg C.

$\Delta$TMC–TSTD min.=55-105 deg C. more preferably $\Delta$TMC–TSTD min.=50-100 deg C. and most preferably $\Delta$TMC–TSTD min.=50-95 deg C.

$\Delta$TMC=TM–TC where TM=Melting temperature in deg. C. and TC=Crystallization temperature deg. C.

Furthermore, the easily deformable film of the present invention may be heat-set about 1.0-20 seconds in a rear room of a tenter with relaxation less than 8% more preferably less than 5% most preferably less than 3%

The preferred value of heat set temperature should be essentially in between TP max and TP min.

and TP max, TP min having following relations

TP max–$\Delta$TCG=30-120 deg C. more preferably=40-110 deg C. most preferably=45-105 deg C. and $\Delta$TMC–TP max=15-100 deg C. $\Delta$TMC–TP max more preferably=25-90 deg C. $\Delta$TMC–TP max most preferably=30-85 deg C.

TP min–$\Delta$TCG=20-70 deg C., TP min–$\Delta$TCG more preferably=30-80 deg C. and TP min–$\Delta$TCG most preferably=40-90 deg C. and $\Delta$TMC–TP min=65-110 deg C. $\Delta$TMC–TP more preferably=55-100 deg C. and $\Delta$TMC–TP min most preferably=50-95 deg C.

Where $\Delta$TCG=TC–TG, TC=Crystallization temperature in deg C. and TG=Gloss transition temperature in deg C.

Films prepared with above process conditions exhibiting average ellipticity (of the ellipse at maximum elongation) not more than 0.6, preferably 0.45 all along width of the film web, Poisson ratio (at elongation greater than 25%) not less than 0.7, preferably not less than 0.8 all along width of the film web, residual enthalpy not below 12% preferably 15% and residual film area (at elongation of 75%) 50-60%

It is to be noted that the film of the present invention with the above-said characteristics exhibits excellent deforming property and is particularly useful for applications involved for wrapping with high speed machines and totally different than that of normal polyester films.

In the preferred embodiment the thickness of bi axially oriented film of the invention is generally in the range of 1 to 100 micron, preferably 10 to 50 micron, preferably 12 to 36 micron Furthermore, the present film may be suitably given surface treatment by corona discharge, plasma, chemical treatment as is conventionally known.

Further-more the present film comprises suitable antistatic compounds as internal use or coatings as external use to get desired film of surface resistivity less than $10^{14}$ ohm-cm. Antistatic compounds/coatings are well known in the art for example like alkyl sulfonates, glycerol esters, long-chain aliphatic amines and amides, phosphate esters, quaternary ammonium salts, polyethylene glycols, polyethylene glycol esters, and ethoxylated long-chained aliphatic amines neutralized alcohol phosphates etc.

Further-more the present film is suitably given metal vapor deposition for metallized applications, known metals like Aluminum, Silica etc. more preferably with Aluminum. And also used for applications of SiOx, AlOx coatings The inventive film produced with the said process parameters thus attaining the properties of specified elongation ellipticity, poisson ratio, residual enthalpy, residual area is capable of fulfilling all the objectives of producing a easily deformable film with superior deforming properties which can be used for various types of wrapping applications.

Following test methods were used to characterize the films
Test Methods

Figure 1A:
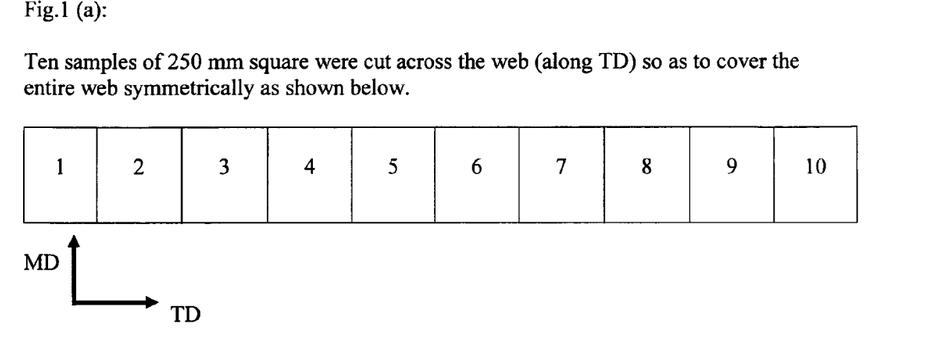
FIG. 1(a) is a diagram of showing ten samples of 250 mm square which were cut across the web (along TD) so as to cover the entire web symmetrically
Figure 1B:
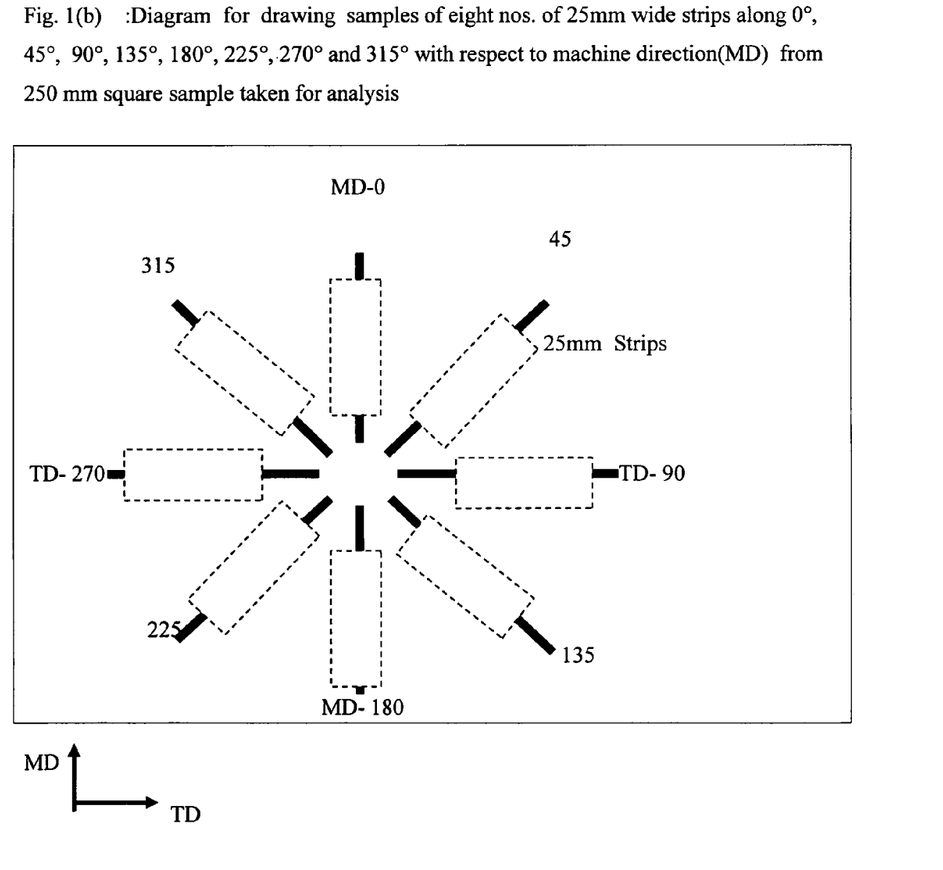
FIG. 1(b) is a diagram showing samples collection of eight nos. of 25 mm wide strips along 0°, 45°, 90°, 135°, 180°, 225°, 270° and 315° with respect to machine direction (MD) on 250 mm square sample taken for analysis.

Sample Preparation Method:

Ten samples of 250 mm square each were cut across the web (along TD) so as to cover the entire web symmetrically as shown in FIG. 1(a). Each sample was again cut into eight 25 mm wide strips along 0°, 45°, 90°, 135°, 180°, 225°, 270° and 315° with respect to machine direction (MD) as shown in FIG. 1(b). Each 25 mm width strip was mounted between the chucks of a mechanical 'Tensile tester' and clear 100 mm length is marked on the sample to measure the properties of average ellipticity, Poisson's ratio and residual area Average Ellipticity (of the Ellipse of Maximum Elongation):

Ellipticity defines the orientation of polymer crystalloids, larger values indicating higher degree of orientation.

Measurement of average ellipticity (of the ellipse of maximum elongation) and computations were done as follows
Measurement Method:

Each set of eight strips were subjected to measurement of the values of maximum elongation at all angles using a load-elongation tester moving at a speed of 100 mm/min.

Maximum elongation values of 0/180, 45/225, 90/270, 135/315 were averaged Major axis (a) is taken as the largest of above four values. Minor axis (b) is the value perpendicular to the major axis.

The ellipticity 'e' is calculated with the formula:

$$e = [1 - b^2/a^2]^{0.5}$$

(Where the major axis and minor axis values are observed values)

All ten samples were measured according to this method to cover entire film web.

Ellipticity values and average ellipticity value at maximum elongation of ellipse for both inventive and normal films were plotted as shown in FIG. 2

Poisson's Ratio

In order to retain the deformation, the film must cross its elastic limit during its intended application One of the indicators characterizing this property is a higher value of Poisson's ratio, as defined below, compared to a normal polyester film.

Poisson's ratio (p) in this context is defined by the ratio of transverse contraction strain ($\epsilon$ transverse) to longitudinal extension strian ($\epsilon$ longitudinal).

$$(p) = -\epsilon \text{ transverse}/\epsilon \text{ longitudinal}$$

Longitudinal strain $\epsilon$ longitudinal is defined as the change in length ($\Delta L$) divided by the original length (L)

Transverse strain $\epsilon$ transverse is defined as the change in width ($\Delta W$) divided by the original width (W)

Measurement Method:

The set of eight strips were subjected to measurement of longitudinal elongation percentage (E %) and the lateral contraction (D %) at a speed of 100 mm/min.

The strip was subjected to load. At longitudinal elongation percentage (E %) of 5%, 10%, 15%, 25%, 35%, 50%, 75% and 100% the width (W mm), at the mid point of the elongated strip was measured by a horizontal mounted scale. The % lateral contraction D % is defined as:

$$D\% = [\{(25-w)/25\} \times 100]\%$$

Poisson ratio (p) is defined as: $p = D\%/E\%$

% Elongation versus vs. Poisson's ratios of inventive and normal film were plotted as shown in FIG. 3)

Residual Enthalpy and Melting Enthalpy

The residual enthalpy and melting enthalpy of the inventive film were studied using Differential Scanning Calorimeter (DSC) (Shimadzu model DSC-60)

The film was heated from 30° C. to 300° C. at a rate of 10° C./min. in nitrogen atmosphere with a flow rate of 40 ml/min.

The polyester film of present invention on first heating showed an exothermic peak in the range of 72-110° C. with a value of $\Delta H_r = 12$-20 J/g. and an endothermic peak at 240-260° C. with an melting enthalpy of 46-50 J/g The above mentioned exothermic peak represents a residual enthalpy existing in the film. This is due to the amount and the spatial arrangement of crystalline and amorphous regions and the method of fabrication.

Tg, Tc and Tm

The temperatures mentioned earlier i.e., Tg, Tc and Tm were also measured using the same DSC Surface Resistivity Surface resistivity of the present invented film was measured according to ASTM D-257. The Surface resistivity found to be in the range of $1*10^7$ to $1*10^{15}$ Residual Area Method of Measurement:

Residual elongated length (L+dL) and residual lateral contracted width (W−dW) were measured using a mechanical tensile tester and a horizontally mounted scale using a method similar to that of the measurement of Poisson's Ratio. On achieving the elongation, stress was retained for 2 minutes and relaxed. Residual elongation (dL) and residual contraction (dW) were measured using a meter scale. Values of A and $A_r$ were obtained as follows.

Method of Calculation:

For a strip of marked length L (original length) and specific width W (original width), residual elongation (dL) and residual lateral contraction (dW) the area A and the residual area $A_r$ are given by $$A = L \cdot W$$

$$A_r = (L+dL)(W-dW)$$

Figure 4A:
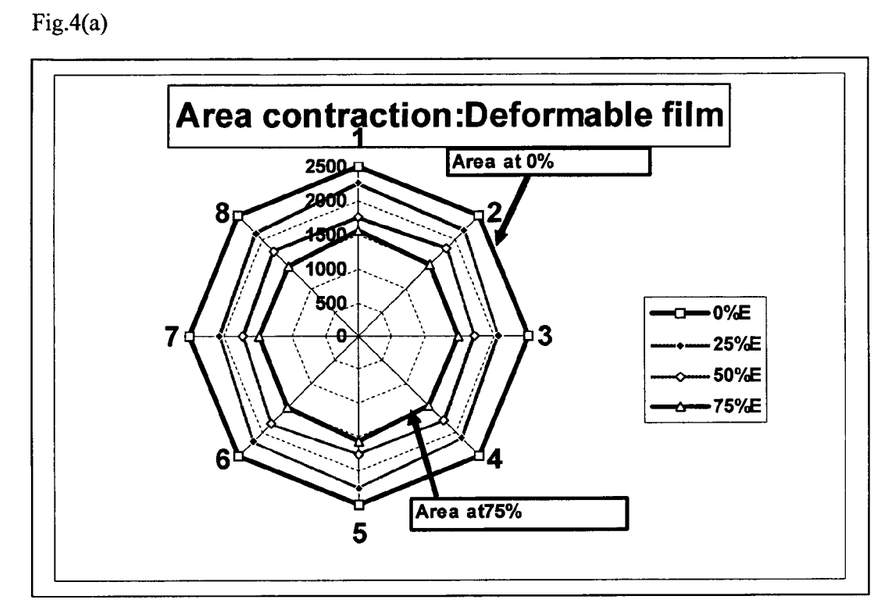
FIG. 4(a) shows the area change of the inventive film. It shows a considerable loss in area on elongation, thereby showing a departure from the elastic nature of a typical polyester film. This departure from elasticity shows that the film is not capable of recovering from a deformation and hence it is easily deformable. Area reduction is evenly distributed in all directions parallel to the surface of the film, which shows that the deformation is evenly distributed
Figure 4B:
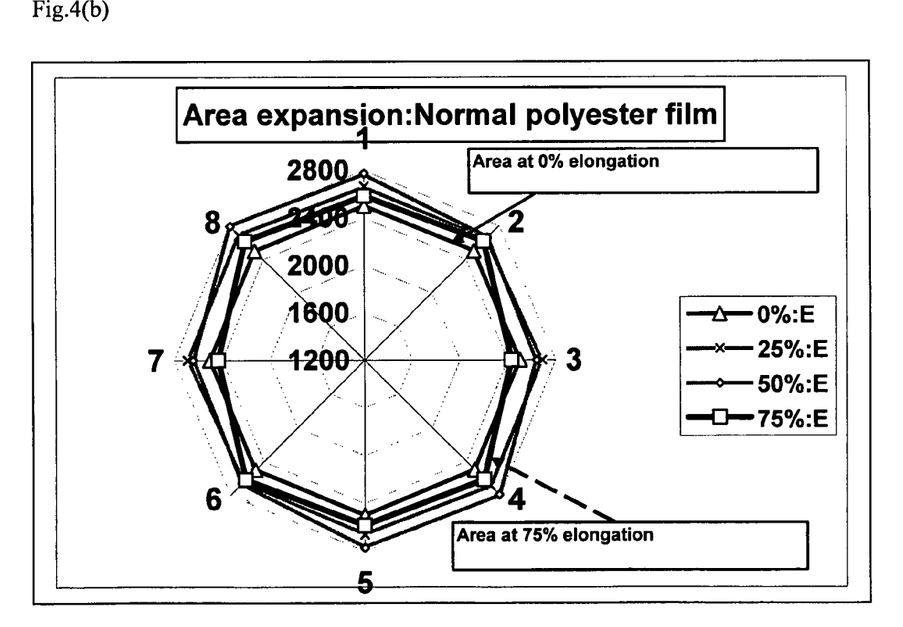
FIG. 4(b) shows a typical polyester film, not suitable for easy deformability, shows a small change in area, on elonga-

All residual area values at different % elongation were plotted in radar graph as shown in FIG. 4(a) and FIG. 4(b) for inventive and normal films.

Deformability

Deformability of the inventive film is graded as follows:

Residual area (measured at 75% elongation) less than 50% results in poor mechanical properties and dimensional stability and hence are not suitable for the intended use.

Residual area (measured at 75% elongation) between 50-60% is graded as excellent Residual area above 60% has insufficient deformability and graded as poor. (All residual area measurement refer to an elongation of 75%)

The advantages of the disclosed invention are thus attained in an economical, practical, and facile manner. While preferred aspects and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention.

Example 1

Purified terephthalic acid and ethylene glycol are mixed in a molar ratio of 1:1.2. Slurry is prepared at room temperature and esterification reaction is carried out with stirring at 260 deg C. and at atmospheric pressure. Water obtained during the reaction is distilled off.

Phosphoric acid is added as stabilizer with phosphor as 20 ppm and antimony trioxide 300 ppm as polycondensation catalyst is also added. The polycondensation is then carried out with stirring at 280 deg C. and a pressure of 1 mbar.

The desired IV of 0.62 is achieved by measuring rpm torque of the stirrer.

The polymer melt thus obtained was extruded from the die and palletized to chips.

These chips are dried at a temperature of 160 deg C. having moisture less than 50 ppm and fed to the extruder.

The dried chips were melted and extruded to form the film with the following conditions.

Film was stretched 3.25 times in MD at TSMD according to $\Delta$TMC-TSMD 65 deg C. and in TD at TSTD according to $\Delta$TMC-TSTD 65 deg C. for 4.0 times. The stretched film is heat set in the oven at TP according to TP-$\Delta$TCG 75 deg C. with 2% relaxation.

Example 2

Process is carried out as in Example 1 with following conditions

Film was stretched 3.0 times in MD at TSMD according to ΔTMC-TSMD 55 deg C. and in TD at TSTD according to ΔTMC-TSTD 75 deg C. for 3.5 times. The stretched film is heat set in the oven at TP according to ΔTMC-TP 85 deg C. with 3% relaxation

Example 3

Process is carried out as in Example 1 with following conditions

Film was stretched 3.5 times in MD at TSMD according to ΔTMC-TSMD 75 deg C. and in TD at TSTD according to ΔTMC-TSTD 55 deg C. for 4.25 times. The stretched film is heat set in the oven at TP according to ΔTMC-TP 90 deg C. with 0% relaxation

Example 4

All operating conditions were repeated as in Example 1 except heat set temperature TP according to ΔTMC-TP 40 deg C. with 1% relaxation

Example 5

All operating conditions were repeated as in Example 1 except heat set temperature TP according to ΔTMC-TP 110 deg C. with 2% relaxation

Comparative Example 1

All operating parameters selected were as in Example 1 except TSTD&TP

TSTD, according to ΔTMC-TSTD 30 deg C. The stretched film is heat set in the oven at TP according to TP-ΔTCG 130 deg C.

Comparative Example 2

All operating parameters selected were as in Example 1 except TSMD&TP

TSMD according to ΔTMC-TSMD 30 deg C. The stretched film is heat set in the oven at TP according to TP-ΔTCG 10 deg C.

Films prepared with different process conditions are measured for ellipticity, Poisson ratio and residual enthalpy, residual film area are checked for these samples and compared in the following Table 1

ADVANTAGES

1. Uniform and easily deformable films for convenient and easy wrappings including high end packaging applications
2. The inventive film has excellent deformation property, stiffness, puncture resistance, perfect optical properties and ease of processing
3. The inventive film is stable enough for running on high speed machines
4. Inventive film can be produced with good quality without hampering productivity and efficiency
5. It has more area per unit mass so is less expensive than most other films

We claim:

1. A biaxially oriented polyester film having an average ellipticity of not more than 0.6, a poisson ratio not less than 0.7 (at elongation greater than 25%) all along the width of web, a residual enthalpy in the range of 12% to 20%, and a continuous reduction in the residual area until 100% elongation, whereby the film uniformly deforms in all directions parallel to the surface of the film.

2. The biaxially oriented polyester film in claim 1, wherein the film has a glass transition temperature in the range of 55° C. to 80° C.

3. The biaxially oriented film in claim 1, wherein the film is suitable for twist wrapping, stretched wrapping and gift wrapping.

4. A process for preparing the biaxially oriented polyester film as claimed in claim 1, said process comprising the steps of:
   a) allowing dicarboxylic acid and alkylene glycol to react along with additives to obtain a molten polyester;
   b) extruding the molten polyester through a die and quenching the same on chilled rollers in order to obtain transparent polyester film; where the process is characterized by
   c) heating the polyester film obtained in step (b) and orienting the film in the biaxial direction, wherein the difference between ΔTMC (the difference in melting temperature and crystallization temperature of the said film) and TSMD (stretching temperature in machine direction) is in the range of 45° C. to 110° C., and the difference between ΔTMC (the difference in melting temperature and crystallization temperature of the said film) and TSTD (stretching temperature in transverse direction) is in the range of 35° C. to 105° C. deformable film;
   d) heat setting the film of step (c) by maintaining the difference between the heat set temperature (TP), and the crystallization temperature and glass transition temperature of the said film (ΔTCG) in the range of 30° C. to

TABLE 1

| Ex | ΔTMC-TSMD ° C. | ΔTMC-TSTD ° C. | ΔTMC-TP ° C. | TP-ΔTCG ° C. | Ellipticity | Poisson Ratio | Residual Enthalpy Joules/Gm | Deformability |
|---|---|---|---|---|---|---|---|---|
| E1 | 65 | 65 | — | 75 | 0.4 | 0.85 | 19 | Excellent |
| E2 | 55 | 75 | 85 | — | 0.5 | 0.75 | 19 | Excellent |
| E3 | 75 | 55 | 90 | — | 0.4 | 0.90 | 18 | Excellent |
| E4 | 65 | 65 | 40 | — | 0.4 | 0.85 | 16 | Excellent |
| E5 | 65 | 65 | 110 | — | 0.5 | 0.85 | 12 | Excellent |
| CE 1 | 65 | 30 | — | 130 | 0.7 | 0.50 | 10 | Poor |
| CE 2 | 30 | 65 | — | 10 | 0.8 | 0.40 | 6 | Poor |

120° C.; and by maintaining the difference between the $\Delta$TMC (difference in melting temperature and crystallization temperature of the said film) and the TP (heat set temperature) in the range of 25° C. to 110° C., for a time period in the range of 1.0 to 20 seconds with relaxation not more than 8% in order to obtain desired uniformly deformable polyester film.

5. The process in claim 4, wherein the dicarboxylic acid is selected from the group comprising 2,6-naphthalene dicarboxylic acid, isophthalic acid, and phthalic acid, and or esters of same along with dimethyl terephthalate or terephthalic acid when used as group of dicarboxylic acids and mixture thereof.

6. The process in claim 4, wherein the alkylene glycol is selected from the group comprising diethylene glycol, propylene glycol, butanediol, hexandiol, neopentyl glycol, trans-1,4-cyclohexanediol and cis-1,4-cyclohexanediol along with ethylene glycol when used as group of alkylene glycols and mixture thereof.

7. The process in claim 4, wherein in step (a) the dicarboxylic acid and alkylene glycol are mixed in the ratio of 1:0.3 to 1:0.5.

8. The process in claim 4, wherein in step (a) the additives are antiblocking agents, antioxidants and stabilizers.

9. The process in claim 4, wherein in step (b) the extrusion of the molten polyester is carried out at a temperature in the range of 250° C. to 300° C.

10. The process in claim 4, wherein in step (b) the quenching is carried out at a temperature in the range of 30° C. to 50° C.

11. The process in claim 4, wherein in step (c) the temperature difference of $\Delta$TMC of the film and the stretching temperature in machine direction (TSMD) is in the range of 55° C. to 95° C.

12. The process in claim 4, wherein in step (c) the temperature difference of $\Delta$TMC of the film and the stretching temperature in transverse direction (TSTD) is in the range of 45° C. to 90° C.

13. The process as claimed in claim 4, wherein in step (d) the heat set temperature (TP) is selected from the conditions below:

TP max-$\Delta$TCG (difference in crystallization temperature and glass transition temperature of polyester film) is in the range of 30 to 120° C., $\Delta$TMC-TP max is in the range of 15 to 100° C., TP min-$\Delta$TCG is in the range of 20 to 70° C., and $\Delta$TMC-TP min is in the range of 65 to 110° C.

14. The process as claimed in claim 4, wherein the biaxially oriented polyester film is optionally provided with an antistatic coating to get the surface resistivity of the film to less than $10^{14}$ ohm cm.

15. The process as claimed in claim 4, wherein the biaxially oriented polyester film is suitable for coating with SiOx and AlOx.

16. The process as claimed in claim 4, wherein the biaxially oriented polyester film is optionally vacuum metallized.

17. The process as claimed in claim 4, wherein the biaxially oriented polyester film has a thickness in the range of 1 to 100 microns.

* * * * *